US009481279B2

(12) United States Patent
Sano et al.

(10) Patent No.: US 9,481,279 B2
(45) Date of Patent: Nov. 1, 2016

(54) SEAT BACK FRAME FOR VEHICLE AND METHOD FOR MANUFACTURING SAME

(75) Inventors: Atsushi Sano, Kanagawa (JP); Yutaka Yagi, Shizuoka (JP)

(73) Assignees: Johnson Controls Technology Company, Holland, MI (US); Teijin Limited, Osaka (JP)

( * ) Notice: Subject to any disclaimer, the term of this patent is extended or adjusted under 35 U.S.C. 154(b) by 0 days.

(21) Appl. No.: 14/237,879

(22) PCT Filed: Aug. 10, 2011

(86) PCT No.: PCT/JP2011/068267
§ 371 (c)(1),
(2), (4) Date: Apr. 28, 2014

(87) PCT Pub. No.: WO2013/021482
PCT Pub. Date: Feb. 14, 2013

(65) Prior Publication Data
US 2014/0232158 A1    Aug. 21, 2014

(51) Int. Cl.
*B60N 2/68* (2006.01)
*B60N 2/22* (2006.01)
*B29C 70/68* (2006.01)

(52) U.S. Cl.
CPC .................. *B60N 2/68* (2013.01); *B29C 70/68* (2013.01); *B29C 70/683* (2013.01); *B60N 2/22* (2013.01); *B60N 2/682* (2013.01); *B60N 2205/50* (2013.01)

(58) Field of Classification Search
CPC ........... B60N 2/68; G01L 3/10; G01L 3/108; B29C 33/00; B29C 35/00; B29C 39/00; B29C 43/00; B29C 51/00; B29C 65/00; B29C 65/34; B29C 65/44
See application file for complete search history.

(56) References Cited

U.S. PATENT DOCUMENTS

| 3,566,447 A | * | 3/1971 | Ogden .......................... 425/128 |
| 6,059,369 A | | 5/2000 | Bateson et al. |
| 6,767,067 B2 | * | 7/2004 | Fourrey et al. .......... 297/452.18 |
| 2003/0117003 A1 | | 6/2003 | Fourrey et al. |
| 2009/0250666 A1 | * | 10/2009 | Saga ............................. 252/512 |
| 2011/0215626 A1 | | 9/2011 | Lehmann |

FOREIGN PATENT DOCUMENTS

| CN | 1094323 A | 11/1994 |
| CN | 101578018 A | 11/2009 |
| CN | 101983118 A | 3/2011 |
| CN | 102036850 A | 4/2011 |
| CN | 102105327 A | 6/2011 |

(Continued)

OTHER PUBLICATIONS

Materials Solutions Composites; What is Cold Press Moulding?; 2010.*

(Continued)

*Primary Examiner* — Jacob Cigna
*Assistant Examiner* — Lee A Holly
(74) *Attorney, Agent, or Firm* — Foley & Lardner LLP

(57) ABSTRACT

A seat back frame (100) for a vehicle made of a fiber-reinforced composite material containing a thermoplastic resin matrix and a reinforcing fiber, the seat back frame (100) including a seat back frame body (1), a metal plate (3) welded to the seat back frame body (1) at a reclining device (2) attaching position, and a metal reclining device (2) weld joined to the metal plate (3).

2 Claims, 8 Drawing Sheets

(56) References Cited

FOREIGN PATENT DOCUMENTS

| | | |
|---|---|---|
| DE | 10 2008 26 176 A1 | 12/2009 |
| EP | 2 186 671 A1 | 5/2010 |
| JP | 61-190251 U | 11/1989 |
| JP | 2002-112848 A | 4/2002 |
| JP | 2004-322881 A | 11/2004 |
| JP | 3737081 B2 | 1/2006 |
| JP | 4236983 B2 | 3/2009 |
| WO | WO-03/016091 A1 | 2/2003 |

OTHER PUBLICATIONS

Arrowhead Plastics Engineering, Inc.; Custom Fiberglass Molding Processess; 2005-2011.*

International Search Report mailed Sep. 13, 2011, as received in corresponding International Patent Application No. PCT/JP2011/068267.

Supplementary Search Report dated Aug. 20, 2015, in European application No. 11 87 0772.8, 7 pages.

Zhan G Lei, et al., "The Joining of Carbon-Fiber Reinforced Composite Material and Metals and the Test on Property Test of Joint", School of Mechanical Engineering & Automation, Beijing University of Aeronautics and Astronautics, Beijing China, pp. 141-147, Jan. 7, 2008, 7 pages.

Office Action dated Feb. 16, 2016, in corresponding Chinese application No. 201180072780.5 and English translation, 36 pages.

* cited by examiner

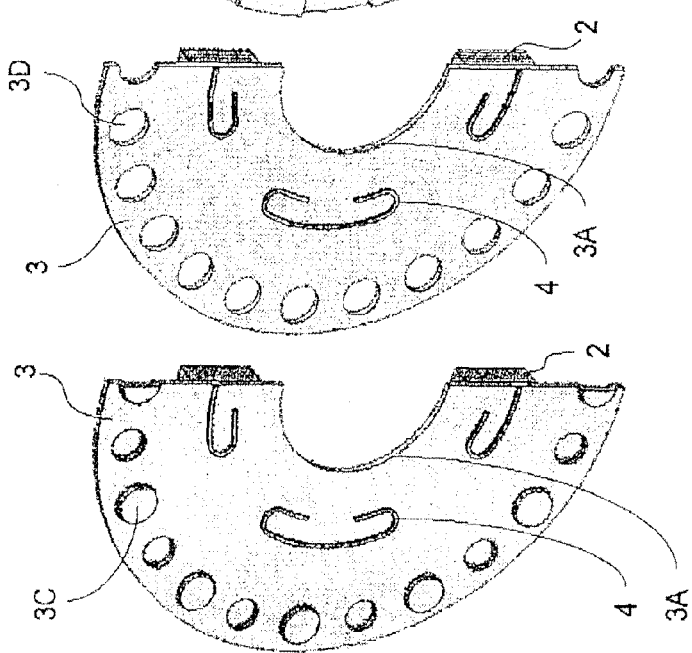

SEAT BACK FRAME FOR VEHICLE AND METHOD FOR MANUFACTURING SAME

CROSS REFERENCE TO RELATED APPLICATIONS

The present application is a U.S. National Stage of International Application No. PCT/JP2011/068267, filed Aug. 10, 2011, the entire disclosure of which is incorporated herein by reference.

TECHNICAL FIELD

The present invention relates to a seat back frame for a vehicle and particularly to a light-weight seat back frame for a vehicle using a fiber-reinforced composite material and a method of manufacturing the same.

BACKGROUND ART

Front seat back frames for a vehicle are required not only to have rigidity to appropriately support an occupant's body but also to have high strength to withstand large load produced by acceleration exerted on the occupant when the vehicle collides.

Seat back frames generally have a structure in which members obtained by bending metal pipes or members obtained by performing sheet metal working on metal sheets are joined to each other by weld joining. However, due to demands for lighter vehicle weight, there have been demands for lighter seat back frames as well. In view of this, manufacturing a seat back frame with a resin or a fiber-reinforced composite material has been considered.

When a resin or a fiber-reinforced composite material is used for a seat back frame, how to attach a reclining device is an important issue: A reclining device is generally formed of complicated parts such as a gear to fix a seat back frame at a given angle in order for an occupant to have an appropriate seating posture, and manufactured using metal because the reclining device needs strength high enough to withstand moment exerted on the seat back frame when the vehicle collides. In the case of a metal seat back frame as mentioned above, the reclining device can be joined directly to the seat back frame by weld joining. However, in the case of using a resin or a fiber-reinforced composite material for a seat back frame, a design that allows the reclining device to be securely fixed to the seat back frame is necessary.

Patent Literature 1 discloses a seat back frame which is formed of molded resin parts and in which each of side frames has a'plate-shaped metal attachment bracket attached to a lower end portion thereof and is connected to a hinge mechanism (reclining device) through this bracket. In the case of this structure, when a large moment load exerted on the seat back frame during collision of the vehicle is transmitted to the reclining device, the load is highly likely to be concentrated at the joining portion of the resin and the bracket. For this reason, it is concerned that both the resin frame and the metal plate bracket may need to be large in size. In addition, attaching the metal plate bracket to the molded resin part requires a post-working such as thermal caulking.

Patent Literature 2 discloses a seat back frame which is formed as a single integral member made of a fiber-reinforced composite material containing a thermoplastic resin matrix and reinforcing fibers, and in which a hinge as part of a reclining device is over-molded in the single integral member. Here, a structure in which the hinge is attached to either one of the left and right sides is shown as a first embodiment. In this case, it is only the hinge mechanism on the one side that will support large moment load exerted on the seat back frame when the vehicle collides. For this reason, it is concerned that the hinge and the seat back frame may need to be large in size. A structure in which the hinge is attached by over-molding on both left and right sides is shown as a second embodiment. In this case, it is possible that the axes of the left and right hinges may be misaligned from each other, thereby impairing smooth motions of the seat back frame, due to contraction or warpage of the fiber-reinforced composite material after its molding. Further, in either embodiment, the shape of the hinge is extremely complicated, and therefore the weight and cost are unlikely to be reduced. Furthermore, the hinge is over-molded while expanding the molded part at inner pressure, and therefore sufficient joining strength is unlikely to be achieved.

CITATION LIST

Patent Literature

Patent Literature 1: Japanese Patent No. 423698
Patent Literature 2: Japanese Patent No. 3737081

SUMMARY OF INVENTION

An object of the present invention is to provide a seat hack frame for a vehicle and a method of manufacturing the same, the seat back frame for a vehicle being capable of achieving significant weight reduction by using a fiber-reinforced composite material for the seat back frame while achieving a production takt the seat back frame for a vehicle being capable of achieving a production takt good enough for production model vehicles and also of securely and accurately attaching a reclining device by using a simple method that minimizes weight and cost increase, when a fiber-reinforced composite material is used for the seat back frame to achieve major weight reduction.

The gist of a first aspect of the present invention is a seat back frame for a vehicle made of a fiber-reinforced composite material containing a thermoplastic resin matrix and a reinforcing fiber, the seat back frame including: a seat back frame body; a metal plate welded to the seat back frame body at a reclining device attaching position; and a metal reclining device weld joined to the metal plate.

The metal plate may be in a circular plate shape or an oval plate shape.

The seat back frame body may have an opening portion having a smaller shape than the metal plate at the reclining device attaching position.

The metal plate may have a through-hole through which a drive shaft to be attached to the reclining device penetrates.

At least a part of one surface of the metal plate excluding a region joined to the reclining device may be welded to the seat back frame body.

At least a part of both surfaces of the metal plate excluding regions joined to the reclining device may be welded to the seat back frame body.

The seat back frame body may include an upper frame and left and right side frames, and the metal plate may be welded to each of the left and right side frames.

The seat back frame for a vehicle may be designed for a front seat.

A gist of a second aspect of the present invention is a method of manufacturing the seat back frame for a vehicle above, the method includes: heating and softening the fiber-reinforced composite material containing the thermoplastic resin, matrix and the reinforcing fiber; and shaping the softened fiber-reinforced composite material by cold press molding into a shape of the seat back frame body and, during the shaping, welding the metal plate to the seat back frame body by insert molding.

The method may further include heating the metal plate with an induction heater before performing the cold press molding.

According to the seat back frame and the method of manufacturing the same of the present invention, attachment of a metal reclining device to a seat back frame body, which is an important issue, can be done accurately with high productivity while minimizing weight and cost increase, when a fiber-reinforced composite material is used for the seat back frame to achieve major weight reduction.

BRIEF DESCRIPTION OF DRAWINGS

FIGS. 8A to 8D are cross-sectional views showing additional working for increasing the welding strength of metal plates and each show a different case.

DESCRIPTION OF EMBODIMENTS

Figure 1:
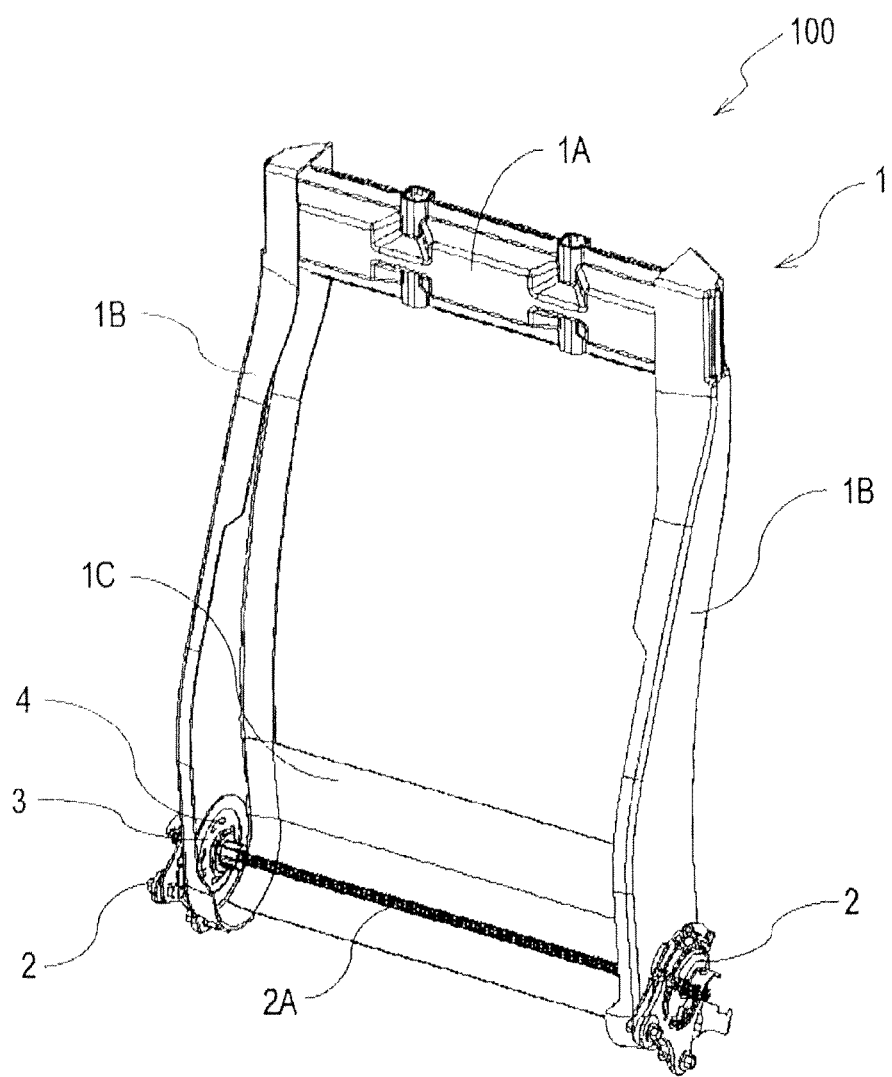
FIG. 1 is a perspective view of a seat back frame according to an embodiment of the present invention with reclining devices attached thereto.

Hereinbelow, a seat back frame and a method of manufacturing the same according to an embodiment of the present invention will be described in detail with reference to the drawings.

[Fiber-Reinforced Composite Material]

A fiber-reinforced composite material in a seat back frame body 1 of a seat back frame 100 according to an embodiment of the present invention is a material containing reinforcing fibers and a thermoplastic matrix resin. As for the form of the reinforcing fibers in the fiber-reinforced composite material, any one of short fibers, long fibers, and continuous fibers may be used, or a combination of two or more of these may be used. The short fibers refer to fibers having fiber lengths of 0.1 to 10 mm. The long fibers refer to fibers having fiber lengths of 10 mm to 100 mm. The continuous fibers refer to fibers having fiber lengths of 100 mm and longer. In the case of the short fibers or the long fibers, they may also be paper made by papermaking using chopped strands or the like. In the case of the continuous fibers, they may be contained in the matrix resin preferably in the form of a sheet such as a woven/knitted fabric, a sheet of strands oriented in one direction, or a multi-axis woven fabric, or a non-woven fabric. Note that the multi-axis woven fabric generally refers to a woven fabric obtained by: stacking sheets formed of bundles of fiber-reinforced materials laid and oriented in one direction, the sheets being stacked on one another at different angles (multi-axis woven fabric base material); and stitching the stacked body with a stitching string such as a nylon string, a polyester string, or a glass-fiber string penetrating the stacked body in the thickness direction thereof between the front surface and the back surface of the stacked body back and forth along these surfaces.

The fiber-reinforced composite material making up the seat back frame body 1 may be a material in which its reinforcing fibers are dispersed randomly or a material in which the fibers are oriented in a particular way. The fiber-reinforced composite material is preferably a material in which its reinforcing fibers are surface oriented or uni-axially oriented, a combination of those, or a stacked body of those. The fiber-reinforced composite material in the seat back frame body can be a stacked body or a sandwich structure of a fiber-reinforced composite material part and a solely resin part. In the case of the sandwich structure, the core member may be the composite material, and the cover member may be the resin, or conversely the core member may be the solely resin part, and the cover member may be the composite material.

The abundance of the thermoplastic resin in the fiber-reinforced composite material making up the seat back frame body 1 is preferably 50 to 1000 parts by weight with respect to 100 parts by weight of the reinforcing fibers. The abundance of the thermoplastic resin is more preferably 55 to 500 parts by weight with respect to 100 parts by weight of the reinforcing fibers. The abundance of the thermoplastic resin is further preferably 60 to 300 parts by weight with respect to 100 parts by weight of the reinforcing fibers.

The thermoplastic resin making up a molded body is not particularly limited to but is preferably at least one kind selected from a group including vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acrylic resin, methacrylic resin, polyethylene resin, polypropylene resin, polyamide 6 resin, polyamide 11 resin, polyamide 12 resin, polyamide 46 resin, polyamide 66 resin, polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, polyether ether ketone resin, polylactic acid resin, a mixture of two or more kinds of resins selected from among these (resin composition), and the like. The above-mentioned resin composition is preferably at least one kind selected from a group including a composition of polycarbonate resin and polyester resin, a composition of polycarbonate and ABS resin, a composition of polyphenylene ether resin and polyamide resin, a composition of polyamide resin and ABS resin, a composition of polyester resin and nylon resin, and the like.

Note that the thermoplastic resin of the fiber-reinforced composite material may contain functional filling materials and additives as long as they do not affect the object of the present invention. Examples of the functional filling materials and additives include but not limited to an organic/inorganic filler, a fire-retardant, a UV resistant agent, a pigment, a mold releasing agent, a softening agent, a plasticizing agent, a surface active agent, and the like.

[Reinforcing Fibers]

The reinforcing fibers used in the seat back frame body 1 of the seat back frame 100 according to the embodiment of the present invention are of preferably at least one kind selected from a group including a glass fiber, a polyester fiber, a polyolefin fiber, a carbon fiber, a para-aramid fiber, a meta-aramid fiber, a boron fiber, an azole fiber, an alumina fiber, and the like, and particularly preferably a carbon fiber having good specific strength and good specific modulus. The reinforcing fibers of the fiber-reinforced composite material used in the seat back frame body 1 are not necessarily of one type. Different types of reinforcing fibers may be used in different portions, or layers of fiber-reinforced composite materials having different types of reinforcing fibers in the same portion may be stacked.

[Seat Back Frame Body]

Figure 2:
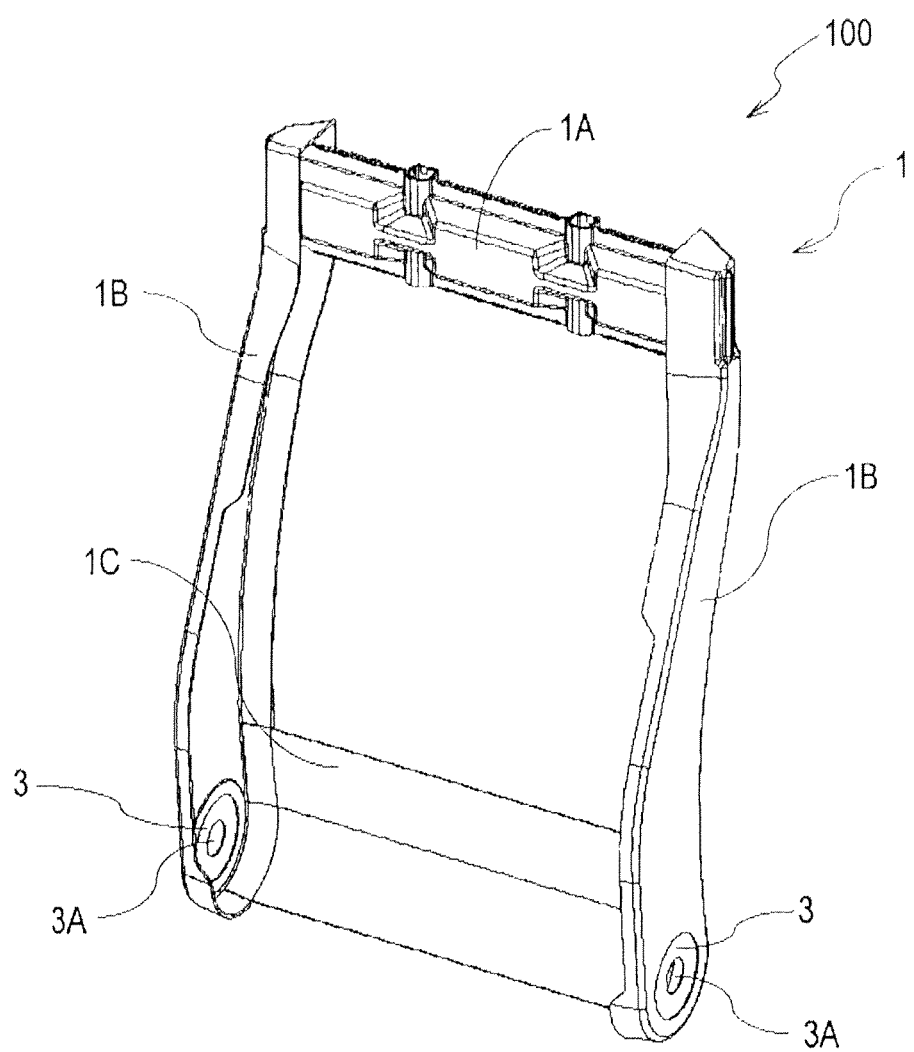
FIG. 2 is a perspective view of the seat back frame according to the embodiment of the present invention before the reclining devices attached thereto.
Figure 3B:
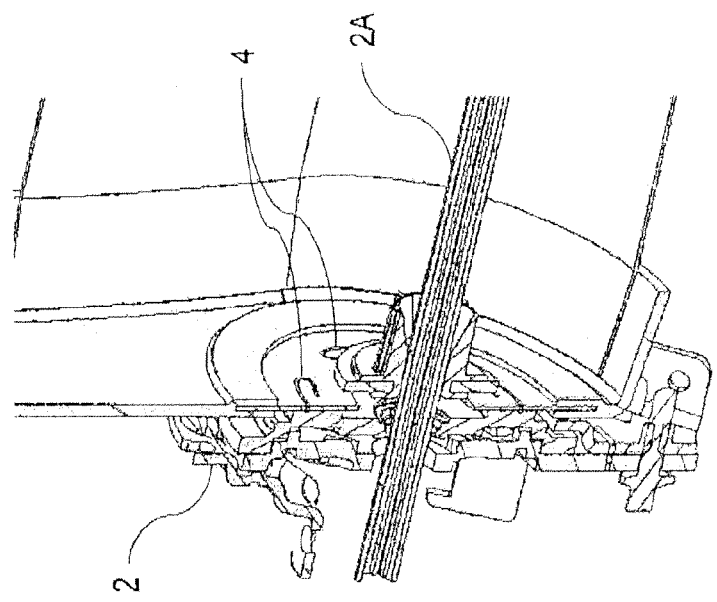
FIG. 3B is an enlarged cross-sectional view of the seat back frame after the reclining devices attached thereto.
Figure 3A:
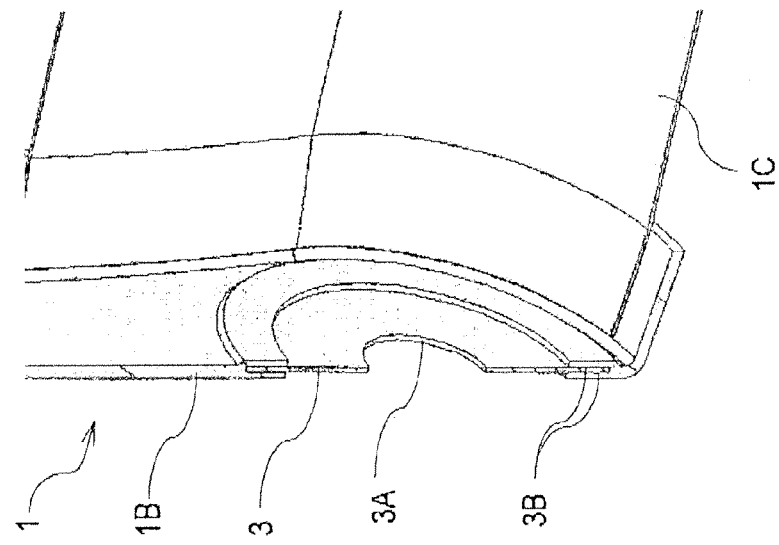
FIG. 3A is an enlarged cross-sectional view of the seat back frame according to the embodiment of the present invention before the reclining devices attached thereto.
Figure 4:
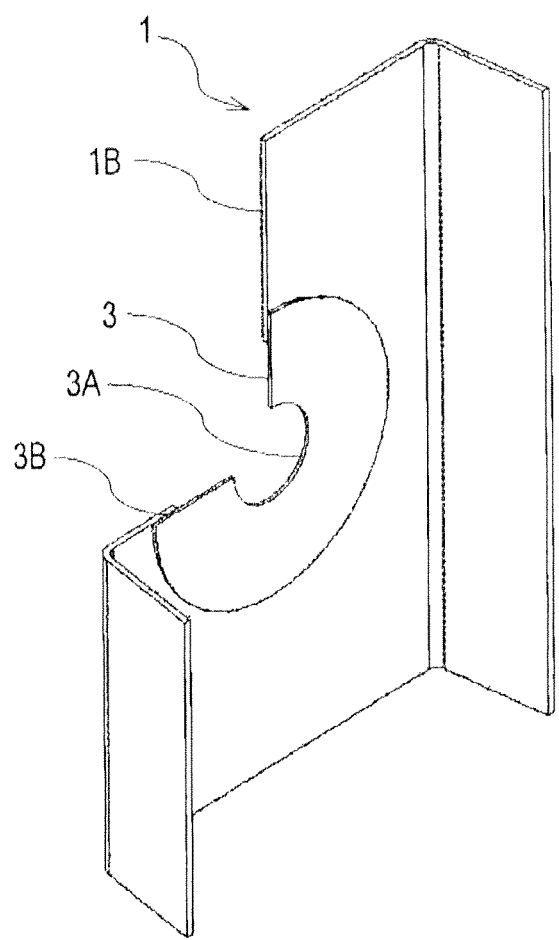
FIG. 4 is a perspective view of a state where one surface of a metal plate (circular plate shape) is welded.
Figure 5:
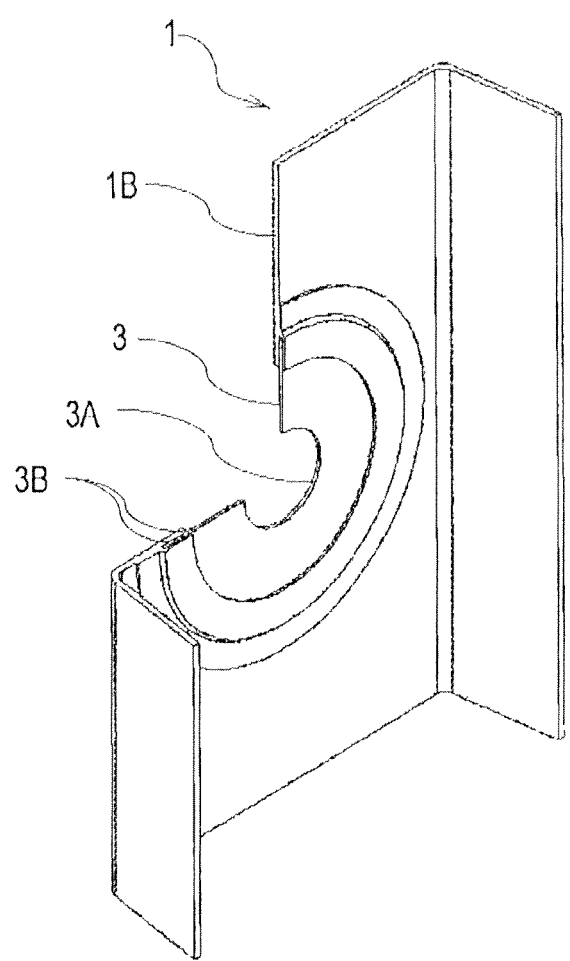
FIG. 5 is a perspective view of a state where both surfaces of a metal plate (circular plate shape) are welded.
Figure 6:
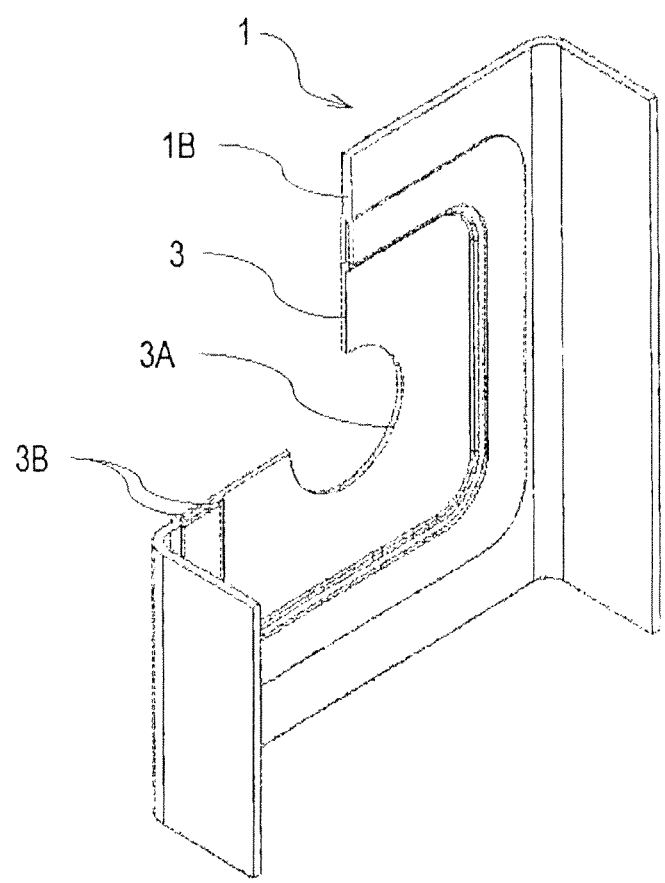
FIG. 6 is a perspective view of a state where both surfaces of a metal plate (substantially rectangular shape) are welded.
Figure 7:
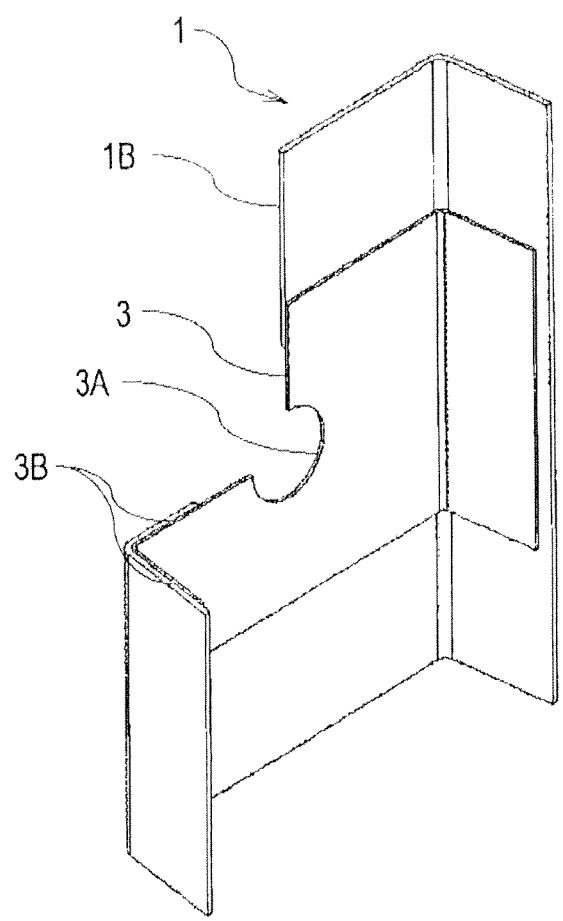
FIG. 7 is a perspective view of a state where one surface of a metal plate (U-shaped) is welded.

The embodiment of the present invention is the seat back frame body 1 made of the fiber-reinforced composite material containing the thermoplastic resin matrix and the reinforcing fibers. Metal plates 3 are welded to the seat back frame body 1 at welding surfaces 3B at positions where reclining devices 2 are attached to the seat back frame body 1. Each reclining device 2, which is made of metal, and its corresponding metal plate 3 are weld joined to each other by weld joining at weld joining surfaces 4. The shape of the seat back frame body 1 is not particularly limited. It may be a single molded part or an assembly of separate molded parts. However, as shown in FIGS. 1 and 2, the seat back frame body 1 may be formed of an upper frame 1A and left and right side frames 1B. In this case, it is possible to improve the production takt and reduce the size of and simplify a mold required for the molding. Further, sufficient molding pressure can be applied to the welding surface of each metal plate 3 and its corresponding side frame 1B, and thereby the welding strength is improved, which is even more preferable. An auxiliary part such as a back cover 1C for protecting the recliner mechanism may be attached to the seat back frame body 1 if necessary. The material of the back cover 1C is not limited, and any suitable material can be selected from among materials such as metals, resins, and fiber-reinforced composite materials. However, considering that it joined to each side frame 13, it is preferable to use a thermoplastic resin or a fiber-reinforced composite material containing a thermoplastic matrix and reinforcing fibers.

Parts such as a recliner, a headrest, a suspension mat, a cushion pad, and a cover material may be attached to the seat back frame body 1. The seat back frame body 1 forms a front seat back when combined with these parts, and finally forms a seat assembly when connected to a cushion frame.

[Reclining Device]

Each reclining device 2 according to the embodiment of the present invention is a device used for metal sheet back frames in general. The reclining device 2 is formed of complicated mechanical parts such as a gear to fix the seat back frame at a given angle in order for an occupant to have an appropriate seating posture. Moreover, the reclining device 2 is manufactured using metal because it needs strength high enough to withstand moment exerted on the seat back frame when the vehicle collides. As the metal material, iron, aluminum, magnesium, titanium and the like are available, but iron is preferably used in view of strength and cost.

[Metal Plate]

As the material of each metal plate 3 according to the embodiment of the present invention, any suitable material can be selected from among metal materials such as iron, aluminum, magnesium, and titanium. However, since the reclining device 2 is often made of iron, the metal plate 3 is preferably made of iron of the same type as well. Moreover, since large load is exerted, the metal plate 3 is more preferably made of high tensile steel.

As the thickness of each metal plate 3, 0.5 to 5 mm is used preferably, and 1 to 2 mm is used more preferably. The shape of the metal plate 3 may be any shape. As shown in FIGS. 4 to 7, a substantially circular plate shape, a substantially oval shape, a substantially rectangular shape, a square U-shape, and the like are available as examples, and shapes obtained by working outer peripheral portions and inner portions of these shapes are included as well. In the case of the substantially rectangular shape or the square U-shape, slip between joint surfaces can be expected to be prevented by a mechanical anchor effect, but the metal plate 3 tends to be large and stress may possibly be concentrated on the seat back frame body 1 as well. On the other hand, in the case of the substantially circular plate shape, moment load exerted, on the seat back frame body 1 can be efficiently transmitted to the reclining device 2, which allows size reduction as compared to general metal plate brackets. Accordingly, the substantially circular plate shape is preferably used. As the outer diameter of the substantially circular plate shape, 70 to 150 mm is used preferably, and 90 to 120 mm is used more preferably.

Each metal plate 3 can be provided with a through-hole 3A for easy attachment of a drive shaft 2A that drives the left and right reclining devices 2 along with each other. As the diameter of the through-hole 3A, 10 to 60 mm is used preferably, and 20 to 50 mm is used more preferably.

The metal plate 3 is also preferably subjected to chemical surface treatment or etching so as to improve the contact thereof with the seat back frame body 1. Moreover, as shown in FIGS. 8A to 8D, the welding surface 3B of the metal plate 3 to the seat back frame body 1 can be also subjected to post-working such as embossing 3C, punching 3D, cutting and raising 3E, or gear cutting 3F, and its mechanical anchor effect can be used to improve the joining strength.

[Joining Metal Plate and Seat Back Frame Body]

In the embodiment of the present invention, each metal plate 3 is welded to the seat back frame body 1 of the seat back frame 100 at the reclining device attaching position. As the welded state, preferably used is a state in which the whole or part of one surface of the metal plate 3 excluding the region joined to the reclining device 2 is welded to the seat back frame body 1. In this case, the structure of a mold to be used to manufacture the seat back frame body 1 can be simplified greatly. In addition, more preferably used is a state in which the whole or part of both surfaces of the metal plate 3 excluding the region joined to the reclining device 2 is welded to the seat back frame body 1. In this case, the area of the welding surface 3B of the metal plate 3 and the seat back frame body 1 increases, thereby making it possible to further reduce the size of the metal plate 3 and to realize a strong structure against non-surface load, other than moment load exerted on the seat back 1 (e.g. load exerted in the left-right direction of the seat back).

Due to the structural nature, it is preferable to weld an outer peripheral portion of each metal plate 3 to an outer side of an opening portion of the seat back frame body 1. As the width of the welding portion, 5 to 20 mm is used preferably, and 10 to 15 mm is used more preferably.

In a case where the distance between the welding portion and the weld joining portion is too close, it is possible that heat produced during the weld joining may adversely affect the welding portion. Thus, the welding portion and the weld joining portion are separated from each other by preferably 5 mm or greater, and more preferably 10 mm or greater.

As the welding method, a method such as vibration welding, ultrasonic welding, or hot plate welding may be used to perform welding after molding. However, more preferably used is a method which involves welding the metal plate 3 to the seat back frame body 1 by insert molding during a shaping step of a method of manufacturing the seat back frame body 1 which involves heating and softening the fiber-reinforced composite material containing the thermoplastic resin matrix and the reinforcing fibers, and shaping the fiber-reinforced composite material into the shape of the seat back frame body 1 by cold press molding. In this way, unnecessary post-processes can be eliminated. Accordingly, it is possible to improve the production takt and also to weld the metal plate 3 and the seat hack frame body 1 stably. Note that when the insertion molding is performed during the cold press molding, it is also preferable to heat the metal plate 3 with an induction heater and then perform the cold press molding. In this way, the metal plate 3 and the seat back frame body 1 can be firmly welded to each other.

[Joining Metal Plate and Reclining Device]

The embodiment of the present invention is the seat back frame body 1 made of the fiber-reinforced composite material containing the thermoplastic resin matrix and the reinforcing fibers. Each metal plate 3 is welded to the seat back frame body 1 at the reclining device attaching position, and each reclining device 2, which is also made of a metal, is weld joined to one of the metal plates 3 by weld joining. Examples of the weld joining method include gas weld joining, arc weld joining, spot weld joining, laser weld joining, friction stir weld joining, and the like. However, spot weld joining or laser weld joining is used preferably in view of the productivity and the freedom of shape of the joining portion, and laser weld joining is used more preferably for it allows high durability.

The seat back frame body 1 after its molding is expected to have strain or warpage to some extent. Thus, it is preferable to attach the left and right reclining devices 2 in a subsequent step by weld joining with a jig or the like. In this way, smooth motions of the seat back frame body 1 can be ensured.

The seat back frame 100 according to the embodiment of the present invention has high strength and rigidity and is light weight as well. Thus, the seat back frame 100 is advantageous especially to a front sat for a vehicle which is required to have high strength and is difficult to reduce in weight.

Although an embodiment of the present invention has been described above, the present invention is not limited to the above embodiment and various modifications can be made thereto.

INDUSTRIAL APPLICABILITY

The seat back frame 100 and the method of manufacturing the same of the present invention are preferably applicable to a front seat for a vehicle and can be supplied at a production takt good enough for production model vehicles.

REFERENCE SIGNS LIST 1 sheet back frame body
1A upper frame
1B side frame
1C back cover
2 reclining device
2A drive shaft
3 metal plate
3A through-hole
3B welding surface
3C embossing
3D punching
3E cutting and raising
3F gear cutting
4 weld joining portion (reclining device/metal plate)
100 seat back frame

The invention claimed is:

1. A method of manufacturing a seat back frame for a vehicle made of a fiber-reinforced composite material containing a thermoplastic resin matrix and a reinforcing fiber, the seat back frame including a seat back frame body, a metal plate fixed to the seat back frame body at a reclining device attaching position, and a metal reclining device weld joined to the metal plate, the method comprising:

heating and softening the fiber-reinforced composite material containing the thermoplastic resin matrix and the reinforcing fiber;

shaping the softened fiber-reinforced composite material by cold press molding into a shape of the seat back frame body and, during the cold press molding, fixing the metal plate to the seat back frame body by insert molding; and weld joining the metal reclining device to the metal plate subsequent to the steps of heating and softening and shaping.

2. The method of manufacturing the seat back frame for a vehicle according to claim 1, the method further comprising heating the metal plate with an induction heater before performing the cold press molding.

* * * * *